US006777458B1

(12) United States Patent
Jaworek et al.

(10) Patent No.: US 6,777,458 B1
(45) Date of Patent: Aug. 17, 2004

(54) METHOD FOR PRODUCING SCRATCH-RESISTANT COATINGS

(75) Inventors: Thomas Jaworek, Kallstadt (DE); Reinhold Schwalm, Wachenheim (DE); Rainer Königer, Freinsheim (DE); Reiner Kranwetvogel, Hassloch (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 110 days.

(21) Appl. No.: 10/049,646

(22) PCT Filed: Aug. 24, 2000

(86) PCT No.: PCT/EP00/08284

§ 371 (c)(1), (2), (4) Date: Feb. 25, 2002

(87) PCT Pub. No.: WO01/14483

PCT Pub. Date: Mar. 1, 2001

(30) Foreign Application Priority Data

Aug. 25, 1999 (DE) ........................................ 199 40 312

(51) Int. Cl.[7] .................................................. C08F 2/46

(52) U.S. Cl. ................................ 522/1; 522/6; 522/90; 522/96; 522/100; 522/104; 522/107; 522/150; 522/120; 522/121; 522/152; 522/153; 522/157; 522/169; 522/182; 522/902; 427/487; 427/491; 427/508; 427/510; 427/495; 264/494; 204/157.15; 204/157.44; 204/471; 204/478

(58) Field of Search ............................ 522/1, 6, 90, 96, 522/100, 104, 107, 150, 152, 153, 157, 169, 170, 915, 12, 902, 120; 427/487, 491, 508, 510, 495; 264/494; 204/157.15, 157.44, 471, 478

(56) References Cited

U.S. PATENT DOCUMENTS

| | | | | | |
|---|---|---|---|---|---|
| 3,798,053 | A | * | 3/1974 | Huemmer | 427/495 |
| 3,935,173 | A | * | 1/1976 | Ogasawara et al. | 522/104 |
| 4,118,873 | A | | 10/1978 | Rothchild | |
| 4,170,663 | A | * | 10/1979 | Hahn et al. | 427/493 |
| 4,262,072 | A | * | 4/1981 | Wendling et al. | 430/14 |
| 5,120,972 | A | | 6/1992 | Rangwalla et al. | |
| 5,318,850 | A | | 6/1994 | Pickett et al. | |
| 5,480,682 | A | * | 1/1996 | Kaiser et al. | 427/459 |
| 5,532,115 | A | * | 7/1996 | Bodager et al. | 430/325 |
| 5,571,570 | A | * | 11/1996 | Lake | 427/494 |
| 5,700,576 | A | | 12/1997 | Brehm et al. | |
| 6,013,693 | A | * | 1/2000 | Takahashi et al. | 522/99 |

FOREIGN PATENT DOCUMENTS

| | | |
|---|---|---|
| DE | 29 28 512 | 1/1981 |
| EP | 0 330 705 | 9/1989 |
| EP | 0 490 472 | 6/1992 |
| EP | 544 465 | 6/1993 |
| JP | 62 214375 | 9/1988 |

OTHER PUBLICATIONS

Derwent Publications, AN 1988–295328, JP 63–214375, Sep. 7, 1988.

Hackl, et al., Additive und Fuelistoffe, pp. 32–36, Laokadditive Fuer UV–Haertende Systeme, May 1997.

* cited by examiner

*Primary Examiner*—James J. Seidleck
*Assistant Examiner*—Sanza L. McClendon
(74) *Attorney, Agent, or Firm*—Oblon, Spivak, McClelland, Maier & Neustadt, P.C.

(57) ABSTRACT

A process for producing scratch-resistant coatings, encompassing the following steps:

applying at least one UV-curable coating composition to at least one surface of an article to be coated, said coating composition comprising at least one polymer and/or oligomer P1 containing on average at least one ethylenically unsaturated double bond per molecule, and curing the coating composition by exposure to UV radiation, which comprises conducting the curing of the coating composition under an oxygen-containing protective gas which has an oxygen partial pressure in the range from 0.2 to 18 kPa.

17 Claims, No Drawings

METHOD FOR PRODUCING SCRATCH-RESISTANT COATINGS

The present invention relates to a process for producing scratch-resistant coatings on the basis of radiation-curable coating compositions.

Coating compositions which cure by UV radiation are used in industry to produce high-quality coatings. Radiation-curable coating compositions are generally flowable formulations based on polymers or oligomers containing crosslinking-active groups which on exposure to UV radiation undergo a crosslinking reaction with one another. This results in the formation of a high molecular mass network and thus in the development of a solid polymeric film. Unlike the heat-curable coating compositions often used to date, radiation-curable coating compositions may be used free from solvents or dispersants. They are further notable for very short curing times, which is particularly advantageous in the case of continuous processing on coating lines.

Coating compositions curable by UV radiation generally give high surface hardness and good chemical resistance. For some time there has been a desire for coatings which possess high scratch resistance, so that when it is cleaned, for example, the coating is not damaged and does not lose its gloss. At the same time, the coatings should retain the properties normally achieved with radiation-cured coatings.

In the literature there have been various descriptions of the physical processes involved in the appearance of scratches and the relationships between scratch resistance and other physical parameters of the coating (on scratch-resistant coatings cf., e.g., J. L. Courter, 23$^{rd}$ Annual International Waterborne, High-Solids and Powder Coatings Symposium, New Orleans 1996).

A variety of test methods have been described to quantify the scratch resistance of a coating. Examples include testing by means of the BASF brush test (P. Betz and A. Bartelt, Progress in Organic Coatings 22 (1993) 27–37), by means of the AMTEC wash brush installation, or various test methods analogous to scratch hardness measurements, as described for example by G. Jüttner, F. Meyer, G. Menning, Kunststoffe 88 (1988) 2038–42. A further test to determine scratch resistance is described in European Coatings Journal 4/99, 100 to 106.

In accordance with the present state of development, three routes to scratch-resistant surfaces are being discussed, which in principle may also be transferred to UV-curing systems.

The first route is based on increasing the hardness of the coating material. For example, EP-A 544 465 describes a coating composition for scratch-resistant coatings which comprises colloidal silica and alkolysis products of alkoxysilyl acrylates. The increase in hardness is based here on the incorporation of the silica into the polymer matrix of the coating. However, the high level of hardness is at the expense of other properties, such as the penetration hardness or the adhesion, which are vital to coating materials.

The second route is based on selecting the coating material such that on scratching it is stressed in the reversible deformation range. The materials involved are those which permit high reversible deformation. However, there are limits on the use of elastomers as coating materials. Coatings of this kind usually exhibit poor chemical stability.

A third approach attempts to produce coatings having a ductile, i.e., plastic deformation behavior and at the same time to minimize the shear stress within the coating material that occurs in scratching. This is done by reducing the friction coefficient, using waxes or slip additives, for example. Coatings additives for UV-curing systems are described, for example, in B. Hackl, J. Dauth, M. Dreyer; Farbe & Lack 103 (1997) 32–36.

U.S. Pat. No. 5,700,576 describes a UV-curing, scratch-resistant coating which comprises 1–30% by weight of a prepolymeric thickener containing thiol groups and 20–80% by weight of one or more polyfunctional acrylates or methacrylates, and also diluents, especially reactive diluents containing a free-radically polymerizable group, free-radical initiators, and further customary additives for producing coatings. The polymerization and thus curing of the coating is initiated by irradiation with UV light, under inert gas, for example.

However, the solutions proposed for producing scratch-resistant coatings are unsatisfactory because they are comparatively expensive and because the other coating properties are not satisfactory.

In another invention, which is the subject of a parallel application, it has been found that scratch-resistant coatings having a balanced profile of properties can be produced if a radiation-curable coating based on urethane acrylates is cured under inert gas conditions. Inert gases generally contain not more than 500 ppm of oxygen, which under standard conditions corresponds to an oxygen partial pressure of less than 0.05 kPa. The substantial exclusion of oxygen requires an expensive technology. In order to exclude oxygen, the curing of the coating on structures, i.e., nonplanar articles having a three-dimensional form, has to be carried out in chambers closed off to the outside and maintained strictly under an inert gas atmosphere. Especially in the case of continuous coating lines, this would necessitate an expensive airlock technology and would therefore be uneconomic.

It is an object of the present invention to provide a simple process for producing scratch-resistant coatings which overcomes the disadvantages of the prior art.

We have found that this object is achieved if a conventional radiation-curable coating composition is cured by exposure to ultraviolet radiation in an oxygen-containing, protective-gas atmosphere having a oxygen partial pressure of not more than 18 kPa, without the need to observe strict inert gas conditions.

The present invention accordingly provides a process for producing scratch-resistant coatings, encompassing the following steps:

- applying at least one UV-curable coating composition to at least one surface of an article to be coated, said coating composition comprising at least one polymer and/or oligomer P1 containing on average at least one ethylenically unsaturated double bond per molecule, and
- curing the coating composition by exposure to UV radiation, which comprises conducting the curing of the coating composition under an oxygen-containing protective gas which has an oxygen partial pressure in the range from 0.2 to 18 kPa.

In the case of a protective gas under atmospheric pressure, an oxygen partial pressure of 18 kPa corresponds to an oxygen fraction of about 20% by volume. Under the same conditions, an oxygen partial pressure of 0.2 kPa corresponds to a volume fraction of 2200 ppm of oxygen in the protective gas (cf. also E. W. Bader [Ed.], Handbuch der gesamten Arbeitsmedizin [Handbook of complete occupational hygiene], Vol. 1, Urban und Schwarzenberg, Berlin, Munich, Vienna, 1961, p. 665). An oxygen partial pressure of 9 kPa corresponds to 10% by volume of oxygen in the protective gas.

For the process of the invention all that is necessary is for the coating compositions to be subject to an oxygen concentration of less than 18 kPa in the regions where curing takes place at the time of their exposure to UV radiation. The relevant regions are the surface regions of the article to be costed which have been provided with the radiation-curable coating compositions, at the time of their exposure to UV radiation. In order to attain optimum scratch resistance, the oxygen partial pressure is preferably not more than 17 kPa (≈19% by volume), in particular not more than 15.3 kPa (≈17% by volume), and with particular preference not more than 13.5 kPa (≈15% by volume). Optimum curing results are generally obtained at oxygen partial pressures in the range from 0.5 kPa to 10 kPa (≈5500 ppm−11% by volume), in particular in the range from 0.5 to 6.3 kPa (≈5500 ppm−7% by volume). Typically, the oxygen partial pressure will not be below a level of 0.5 kPa, especially 0.9 kPa (≈1% by volume), 1.8 kPa (≈2% by volume), or 2.5 kPa (≈3% by volume).

Suitable protective gases include inert gases such as nitrogen, carbon monoxide, carbon dioxide and noble gases, e.g., argon, and mixtures thereof with air or oxygen, preferred inert gases being argon and nitrogen, especially nitrogen.

Suitable polymers P1 for the radiation-curable formulations of the invention are in principle all polymers and/or oligomers having on average at least one ethylenically unsaturated double bond per polymer or oligomer molecule, which may be free-radically polymerized under the action of electromagnetic radiation, such as UV radiation.

In general, the amount of ethylenically unsaturated double bonds in P1 will be situated within the range from 0.01 to 1.0 mol/100 g of P1, preferably in the range from 0.05 to 0.8 mol/100 g of P1, and with very particular preference from 0.1 to 0.6 mol/100 g of P1. The terms polymer and oligomer as used here and below embrace addition polymers, polycondensates and polyaddition products, chemically modified polymers, and prepolymers. Suitable prepolymers are obtainable, for example, by reacting polyfunctional compounds having at least two reactive groups with monofunctional or polyfunctional compounds having at least one ethylenically unsaturated double bond and at least one reactive group which is able to react with the reactive groups of the abovementioned polyfunctional compounds with formation of bonds.

The polymers and/or oligomers generally have a number-average molecular weight $M_n$ of at least 400 g/mol. Preferably, $M_n$ is not more than 50,000 and in particular is situated within the range from 500 to 5000.

In the process of the invention it is preferred to use coating compositions whose polymers or oligomers P1 contain per molecule on average at least 2 and with particular preference from 3 to 6 double bonds.

The polymers or oligomers P1 preferably have a double bond equivalent weight of from 400 to 2000, with particular preference from 500 to 900.

Furthermore, the radiation-curable coating compositions preferably have a viscosity of from 250 to 11,000 mPas (as determined by means of a rotational viscometer in accordance with DIN EN ISO 3319).

Radiation-curable polymers and/or oligomers P1 of this kind are sufficiently well known to the skilled worker. An overview of such coating compositions is given, for example, in P. K. T. Oldring (editor) Chemistry and Technology of UV and EB Formulations for Coatings and Paints, Vol. II, SITA Technology, London, 1991. The full content of said work insofar as it describes radiation-curable coating compositions is hereby incorporated by reference.

In the polymers or oligomers P1, the double bonds generally have a vinylidene structure ($CH_2$=CR structure where R=H or $CH_3$) which is derived from vinyl, allyl or methallyl esters, ethers or amines or from α,β-ethylenically unsaturated monocarboxylic acids such as acrylic acid, methacrylic acid or their amides. In the process of the invention, preference is given to polymers and/or oligomers P1 whose double bonds are in the form of acrylate, methacrylate, acrylamide or methacrylamide groups. Examples thereof are polyether acrylates, polyester acrylates, unsaturated polyesters, epoxy acrylates, urethane acrylates, amino acrylates, melamine acrylates, silicone acrylates, and the corresponding methacrylates. Particularly preferred polymers and/or oligomers P1 are selected from urethane (meth)acrylates, polyester (meth)acrylates, oligoether (meth)acrylates, and epoxy (meth)acrylates, particular preference being given, with regard to weathering stability of the coatings, to urethane (meth)acrylates and polyester (meth)acrylates, especially aliphatic urethane acrylates.

The silicone (meth)acrylates are generally linear or cyclic polydimethylsiloxanes having acrylic and/or methacrylic groups which are connected via an oxygen atom or via an alkylene group to the silicon atoms of the polydimethylsiloxane parent structure. Silicone acrylates are described, for example, in P. K. T. Oldring (see above), pp. 135 to 152. The disclosure made therein is hereby incorporated fully by reference.

Suitable ethylenically unsaturated epoxy acrylates are, in particular, the reaction products of oligomers or compounds containing epoxy groups with acrylic acid or methacrylic acid. Typical compounds containing epoxy groups are the polyglycidyl ethers of polyhydric alcohols. These include the diglycidyl ethers of bisphenol A and of its derivatives, and also the diglycidyl ethers of oligomers of bisphenol A, as obtainable by reacting bisphenol A with the diglycidyl ether of bisphenol A, and, further, the polyglycidyl ethers of novolaks. The reaction products of acrylic acid and/or methacrylic acid with the abovementioned epoxides may further be modified with primary or secondary amines. In addition, further ethylenically unsaturated groups may be introduced into the epoxy (meth)acrylates by reacting OH groups in epoxy resins with suitable derivatives of ethylenically unsaturated carboxylic acids, examples being the acid chlorides. Epoxy (meth)acrylates are sufficiently well known to the skilled worker and are available commercially. For further details, reference is made to P. K. T. Oldring, pages 37 to 68, and the literature cited therein.

Melamine acrylates are understood to be the reaction products of melamine/formaldehyde condensation products with hydroxyalkyl esters of acrylic acid or of methacrylic acid, and also with acrylic acid, methacrylic acid or with their ester-forming derivatives. Examples of suitable melamine/formaldehyde condensation products are hexamethylol melamine (HMM) and hexamethoxymethylolmelamine (HMMM). Furthermore, both HMM and HMMM may be modified with the amides of ethylenically unsaturated carboxylic acids, an example being acrylamide or methacrylamide, to give ethylenically unsaturated melamine (meth)acrylates. Melamine (meth)acrylates are known to the skilled worker and are described, for example, in P. K. T. Oldring, pp. 208 to 214, and also in EP-A 464 466 and DE-A 25 50 740, to which reference is made for further details. Polyester (meth)acrylates are likewise known to the skilled worker. They are obtainable by a variety of methods. For example, acrylic acid and/or methacrylic acid may be used directly as the acid component when synthesizing the polyesters. A further possibility is to use hydroxyalkyl esters of (meth)acrylic acid as the alcohol component, directly, when synthesizing the polyesters.

The polyester (meth)acrylates are preferably prepared by reacting hydroxyl-containing polyesters with acrylic or methacrylic acid or their ester-forming derivatives. It is also possible to start from carboxyl-containing polyesters, which are then reacted with a hydroxyalkyl ester of acrylic or methacrylic acid. Unreacted (meth)acrylic acid may be removed from the reaction mixture by washing, distillation or, preferably, by reaction with an equivalent amount of a monoepoxide or diepoxide compound with the use of suitable catalysts, such as triphenylphosphine, for example. The products of this reaction generally remain in the radiation-curable coating composition and are incorporated into the polymer network in the course of curing. For further details, reference may be made to P. K. T. Oldring, pp. 123 to 135. Their number-average molecular weight is generally in the range from 500 to 10,000 and preferably in the range from 800 to 3000.

Suitable polyesters containing hydroxyl groups for the preparation of polyester (meth)acrylates may be prepared in conventional manner by polycondensing dibasic or polybasic carboxylic acids with diols and/or polyols, the OH-containing component being used in excess. Accordingly, polyesters containing carboxyl groups are prepared by employing the carboxyl-containing component in excess. Suitable carboxylic acid components in this case include aliphatic and/or aromatic $C_3$–$C_{36}$ carboxylic acids, their esters and anhydrides. They include maleic acid, maleic anhydride, succinic acid, succinic anhydride, glutaric acid, glutaric anhydride, adipic acid, pimellic acid, suberic acid, azelaic acid, sebacic acid, phthalic acid, phthalic anhydride, isophthalic acid, terephthalic acid, tetrahydrophthalic acid, tetrahydrophthalic anhydride, trimellitic acid, trimellitic anhydride, pyromellitic acid, and pyromellitic anhydride. Examples of suitable diol components are ethylene glycol, propylene glycol, 1,4-butanediol, 1,5-pentanediol, neopentyl glycol, 1,6-hexanediol, 2-methyl-1,5-pentanediol, 2-ethyl-1,4-butanediol, dimethylolcyclohexane, diethylene glycol, triethylene glycol, mixtures thereof, and also polyaddition polymers of cyclic ethers, such as polytetrahydrofuran, polyethylene glycol, and polypropylene glycol. Higher polyfunctional alcohols that are suitable include in particular trihydric to hexahydric alcohols, such as glycerol, trimethylolethane, trimethylolpropane, trimethylolbutane, pentaerythritol, dipentaerythritol, ditrimethylolpropane, sorbitol, erythritol, and 1,3,5-trihydroxybenzene, and also the alkoxylated derivatives of the abovementioned polyfunctional alcohols. Polyether (meth)acrylates are likewise known in principle to the skilled worker. Polyether (meth)acrylates are composed of a polyether base unit having acrylate and/or methacrylate groups at its ends. The polyether base unit is obtainable, for example, by controlled. polymerization of epoxides such as ethylene oxide or propylene oxide or by reacting a polyhydric alcohol, for example, an alcohol specified above as the polyol component for preparing polyesters, with epoxides such as ethylene oxide and/or propylene oxide. This polyether base unit further contains free OH groups which may in accordance with known methods be esterified with acrylic acid and/or methacrylic acid, or ester-forming derivatives such as acid chlorides, $C_1$–$C_4$ alkyl esters, or anhydrides (cf., e.g., Houben-weyl, Volume XIV, 2, Makromolekulare Stoffe II (1963)). Suitable polyethers also include polymerization products of tetrahydrofuran and of oxetane.

Flexibilization of the polyether (meth)acrylates and of the polyester (meth)acrylates is possible, for example, by reacting corresponding OH-functional prepolymers and/or oligomers (based on polyether or polyester) with relatively long-chain aliphatic dicarboxylic acids, especially aliphatic dicarboxylic acids having at least 6 carbon atoms, such as adipic acid, sebacic acid, dodecanedioic acid, and/or dimeric fatty acids, for example. This flexibilization reaction may be conducted either before or after the addition of acrylic and/or methacrylic acid to the oligomers and/or prepolymers.

The invention's preferred urethane (meth)acrylates generally comprise oligomeric compounds containing urethane groups and acryloxyalkyl and/or methacryloxyalkyl groups or (meth)acrylamidoalkyl groups. Urethane (meth)acrylates normally have a number-average molecular weight $M_n$ in the range from 500 to 5000 daltons, preferably in the range from 500 to 2000 daltons (determined by means of GPC on the basis of authentic comparison samples). Preferred in accordance with the invention are urethane (meth)acrylates having on average at least two double bonds, especially those having on average from three to six double bonds per molecule. The aliphatic urethane (meth)acrylate prepolymers PU which are particularly preferred in accordance with the invention are essentially free from aromatic structural elements, such as phenylene or naphthylene or substituted phenylene or naphthylene groups.

The urethane (meth)acrylates or mixtures thereof with a reactive diluent that are employed in accordance with the invention preferably have a viscosity (as determined using a rotational viscometer in accordance with DIN EN ISO 3319) in the range from 250 to 11,000 mPa.s, in particular in the range from 2000 to 7000 mPa.s.

The aliphatic urethane (meth)acrylates are known in principle to the skilled worker and may be prepared, for example, as described in EP-A-203 161. The content of that document, insofar as it relates to urethane (meth)acrylates and their preparation, is hereby incorporated fully by reference.

Urethane (meth)acrylates preferred in accordance with the invention are obtainable by reacting at least 25% of the isocyanate groups of a compound containing isocyanate groups (component A) with at least one hydroxyalkyl ester of acrylic acid and/or of methacrylic acid (component B) and, if desired, with at least one further compound having at least one functional group which is reactive toward isocyanate groups (component C), examples being chain extenders C1.

The relative amounts of components A, B and C are preferably chosen such that 1. the ratio of equivalents of the isocyanate groups in component A to the reactive groups in component C is between 3:1 and 1:2, preferably between 3:1 and 1.1:1, and in particular about 2:1, and
2. the hydroxyl groups of component B correspond to the stoichiometric amount of the free isocyanate groups of component A, i.e., to the difference between the total number of isocyanate groups of component A minus the reactive groups of component C (or minus the reacted reactive groups of component C if only partial reaction of the reactive groups is intended).

Preferably, the urethane (meth)acrylate contains no free isocyanate groups. In one advantageous embodiment, therefore, component B is reacted in a stoichiometric ratio with the free isocyanate groups of the reaction product of component A and component C.

The urethane (meth)acrylates may also be prepared by first reacting some of the isocyanate groups of a low molecular mass diisocyanate or polyisocyanate, as component A, with at least one hydroxyalkyl ester of an ethylenically unsaturated carboxylic acid, as component B, and subsequently reacting the remaining isocyanate groups with component C, e.g., with a chain extender C1. In this case it is also possible to use mixtures of chain extenders.

In this case also, the relative amounts of components A, B and C are chosen such that the ratio of equivalents of the isocyanate groups to the reactive groups of the chain extender is between 3:1 and 1:2, preferably 2:1, and the ratio of equivalents of the remaining isocyanate groups to the hydroxyl groups of the hydroxyalkyl ester is 1:1.

Compounds A containing isocyanate groups are understood, hereinbelow, to be low molecular mass, aliphatic or aromatic diisocyanates or polyisocyanates and also aliphatic or aromatic polymers or oligomers containing isocyanate groups (prepolymers) having at least two and preferably from three to six free isocyanate groups per molecule. The boundary between the low molecular mass diisocyanates or polyisocyanates and the prepolymers containing isocyanate groups is fluid. Typical prepolymers containing isocyanate groups generally have a number-average molecular weight $M_n$ in the range from 500 to 5000 daltons, preferably in the range from 500 to 2000 daltons. The low molecular mass diisocyanates or polyisocyanates preferably have a molecular weight of less than 500 daltons, in particular of less than 300 daltons.

Typical aliphatic diisocyanates or polyisocyanates of low molecular mass are tetramethylene diisocyanate, hexamethylene diisocyanate, octamethylene diisocyanate, decamethylene diisocyanate, dodecamethylene diisocyanate, tetradecamethylene diisocyanate, 1,6-diisocyanato-2,2,4-trimethylhexane, 1,6-diisocyanato-2,2,4,4-tetramethylhexane, 1,2-, 1,3- or 1,4-diisocyanatocyclohexane, 4,4'-di(isocyanatocyclohexyl) methane, 1-isocyanato-3,3,5-trimethyl-5-(isocyanatomethyl)cyclohexane (isophorone diisocyanate), 2,4- or 2,6-diisocyanato-1-methylcyclohexane, and also the uretdiones, biurets, cyanurates and allophanates of the abovementioned diisocyanates. Examples of aromatic diisocyanates and polyisocyanates are diisocyanates, such as 2,4-diisocyanatotoluene, 2,6-diisocyanatotoluene, tetramethylxylylene diisocyanate, 1,4-diisocyanatobenzene, 4,4'- and 2,4-diisocyanatodiphenylmethane, p-xylylene diisocyanate, and also isopropenyldimethyltolylene diisocyanate and also the uretdiones, biurets, cyanurates and allophanates of the abovementioned aromatic diisocyanates.

The polyisocyanates containing isocyanurate groups comprise, in particular, simple triisocyanato isocyanurates, which represent cyclic trimers of the diisocyanates, or comprise mixtures with their higher homologs having more than one isocyanurate ring. Mention may be made here by way of example of the isocyanurate of hexamethylene diisocyanate and of the cyanurate of toluene diisocyanate, which are available commercially. Cyanurates are used preferably in preparing urethane (meth)acrylates.

Uretdione diisocyanates comprise cyclic dimerization products of diisocyanates. The uretdione diisocyanates may be used, for example, as sole component or in a mixture with other polyisocyanates, especially with the polyisocyanates containing isocyanurate groups, to prepare urethane (meth) acrylates. Suitable polyisocyanates containing biuret groups preferably have an NCO content of from 18 to 22% by weight and an average NCO functionality of from 3 to 4.5.

Allophanates of the diisocyanates may be obtained, for example, by reacting excess amounts of diisocyanates with simple, polyhydric alcohols, such as, for example, trimethylolpropane, glycerol, 1,2-dihydroxypropane, or mixtures thereof. Polyisocyanates containing allophanate groups that are suitable for preparing urethane (meth) acrylates generally have an NCO content of from 12 to 20% by weight and an average NCO functionality of from 2.5 to 3.

Suitable hydroxyalkyl esters of acrylic acid and of methacrylic acid (component B) are the monoesters of acrylic acid and, respectively, of methacrylic acid with $C_2$–$C_{10}$ alkanediols, such as 2-hydroxyethyl acrylate, 2-hydroxyethyl methacrylate, 3-hydroxypropyl acrylate, 3-hydroxypropyl methacrylate, 4-hydroxybutyl acrylate, and 4-hydroxybutyl methacrylate. As well as or in addition to the hydroxyalkyl esters of acrylic acid and/or of methacrylic acid it is also possible to use other hydroxyl-containing esters of acrylic acid and/or of methacrylic acid in order to introduce double bonds into the urethane (meth) acrylate prepolymer, such as trimethylolpropane diacrylate or dimethacrylate, and also hydroxyl-carrying amides of acrylic acid and of methacrylic acid, such as 2-hydroxyethylacrylamide and 2-hydroxyethylmethacrylamide.

Suitable chain extenders (component C1) are aliphatic diols or polyols having up to 20 carbon atoms, such as ethylene glycol, diethylene glycol, propylene glycol, dipropylene glycol, 1,4-butanediol, 1,5-pentanediol, neopentyl glycol, 1,6-hexanediol, 2-methyl-1,5-pentanediol, 2-ethyl-1, 4-butanediol, 2,2-bis(4'-hydroxycyclohexyl)propane, dimethylolcyclohexane, glycerol, trimethylolethane, trimethylolpropane, trimethylolbutane, pentaerythritol, ditrimethylolpropane, erythritol and sorbitol; diamines or polyamines having up to 20 carbon atoms, such as ethylenediamine, 1,3-propanediamine, 1,2-propanediamine, neopentanediamine, hexamethylenediamine, octamethylenediamine, isophoronediamine, 4,4'-diaminodicyclohexylmethane, 3,3'-dimethyl-4,4'-diaminodicyclohexylmethane, 4,7-dioxadecane-1,10-diamine (3,3'-bis[1,2-ethanediylbis(oxy)]-1-propanamine), 4,9-dioxadodecane-1,12-diamine (3,3'-bis[1,3-butanediylbis (oxy)]-1-propanamine), 4,7,10-trioxatridecane-1,13-diamine (3,3'-bis[oxybis(2,1-ethanediyloxy)]-1-propanamine), 2-(ethylamino)ethylamine, 3-(methylamino) propylamine, diethylenetriamine, $N_3$ Amine (N-(2-aminoethyl)-1,3-propylenediamine), dipropylenetriamine or $N_4$ Amine (N,N'-bis(3-aminopropyl)ethylenediamine); alkanolamines having up to 20 carbon atoms, such as monoethanolamine, 2-amino-1-propanol, 3-amino-1-propanol, 2-amino-1-butanol, isopropanolamine, 2-amino-2-methyl-1-propanol, 5-amino-1-pentanol, 2-amino-1-pentanol, 6-aminohexanol, methylaminoethanol, 2-(2-aminoethoxy)ethanol, N-(2-aminoethyl)ethanolamine, N-methylethanolamine, N-ethylethanolamine, N-butylethanolamine, diethanolamine, 3-(2-hydroxyethylamino)-1-propanol or diisopropanolamine; and dimercaptans or polymercaptans having up to 20 carbon atoms, such as 1,2-ethanedithiol, 1,3-propanedithiol, 1,4-butanedithiol, 2,3-butanedithiol, 1,5-pentanedithiol, 1,6-hexanedithiol, 1,8-octanedithiol, 1,9-nonanedithiol, 2,3-dimercapto-1-propanol, dithiothreitol, dithioerythritol, 2-mercaptoethyl ether or 2-mercaptoethyl sulfide. Further suitable chain extenders include oligomeric compounds having two or more of the abovementioned reactive functional groups, examples being hydroxyl-containing oligomers, such as polyethers, polyesters or hydroxyl-containing acrylate/methacrylate copolymers. Oligomeric chain extenders are extensively described in the literature and generally have molecular weights in the range from 200 to 2000 daltons.

Preferred chain extenders are the diols or polyols having up to 20 carbon atoms, especially the aliphatic diols having 2 to 20 carbon atoms, examples being ethylene glycol, diethylene glycol, neopentyl glycol, and 1,6-hexanediol.

It is preferred in the process of the invention to employ urethane (meth)acrylates obtainable by reacting the component B with at least one isocyanato-containing prepolymer having at least two isocyanate groups per molecule as component A. In this case, preference is given to those isocyanato-containing prepolymers which are obtainable by reacting one of the abovementioned low molecular mass diisocyanates or polyisocyanates with at least one of the compounds of component C1, the ratio of equivalents of the isocyanate groups to the reactive groups of component C1 being in particular about 2:1. Preference is further given to those compounds containing isocyanate groups that are selected from the isocyanurates and biurets of aliphatic or aromatic diisocyanates.

Component C further includes compounds C2 which flexibilize the UV-cured coating. Flexibilization can be achieved, inter alia, by reacting at least some of the free isocyanate groups of the binder with hydroxyalkyl esters and/or alkylamine amides of relatively long-chain dicarboxylic acids, preferably aliphatic dicarboxylic acids having at least 6 carbon atoms. Examples of suitable dicarboxylic acids are adipic acid, sebacic acid, dodecanedioc acid, and/or dimeric fatty acids. The flexibilization reactions may in each case be carried out before or after the addition of component B onto the isocyanato-containing prepolymers. Flexibilization is also achieved by using relatively long-chain aliphatic diols and/or diamines, especially aliphatic diols and/or diamines having at least 6 carbon atoms, as chain extenders C1.

In addition to the polymers and/or oligomers P1, the coating compositions may comprise one or more reactive diluents. Reactive diluents are liquid compounds of low molecular mass which have at least one, polymerizable, ethylenically unsaturated double bond. An overview of reactive diluents can be found, for example, in J. P. Fouassier (ed.), Radiation Curing in Polymer Science and Technology, Elsevier Science Publisher Ltd., 1993, Vol. 1, pp. 237–240. They are used usually to influence the viscosity and the technical properties of the coating, such as the crosslinking density, for example.

The coating compositions used in accordance with the invention contain reactive diluents preferably in an amount of up to 70% by weight, with particular preference from 15 to 65% by weight, based on the overall weight of P1 and reactive diluent in the coating composition.

Examples of reactive diluent classes include (meth) acrylic acid and esters thereof with diols, polyols and amino alcohols, maleic acid and its esters and monoesters, vinyl esters of saturated and unsaturated carboxylic acids, vinyl ethers, and vinylureas. Examples that may be mentioned include $C_2$–$C_{12}$ alkylene glycol di(meth)acrylates such as 1,4-butanediol di(meth)acrylate, 1,6-hexanediol di(meth) acrylate and 1,12-dodecyl diacrylate, esters of acrylic acid or of methacrylic acid with (poly)ether diols, such as dipropylene or tripropylene glycol di(meth)acrylate, triethylene glycol di(meth)acrylate and polyethylene glycol di(meth) acrylate, esters of acrylic acid or of methacrylic acid with olefinically unsaturated alcohols, such as vinyl (meth) acrylate, allyl (meth)acrylate and dicyclopentadienyl acrylate, esters of acrylic acid or of methacrylic acid with higher polyhydric alcohols such as glycerol tri(meth) acrylate, trimethylolpropane tri(meth)acrylate, trimethylolpropane di(meth)acrylate, pentaerythritol tri(meth)acrylate, pentaerythritol tetra(meth)acrylate, and also monounsaturated compounds such as vinyl acetate, styrene, vinyltoluene, ethoxy(ethoxy)ethyl acrylate, N-vinylpyrrolidone, phenoxyethyl acrylate, dimethylaminoethyl acrylate, hydroxyethyl (meth)acrylate, butoxyethyl (meth)acrylate, and isobornyl (meth)acrylate, and also diunsaturated or polyunsaturated compounds such as divinylbenzene and dimethylacrylamide. Furthermore, it is also possible to use the reaction product of two moles of acrylic acid with one mole of a dimeric fatty alcohol having generally 36 carbon atoms. Mixtures of said reactive diluents are also suitable.

Preference is given to reactive diluents based on esters of acrylic acid and/or of methacrylic acid, among which monoacrylates and diacrylates and also monomethacrylates and dimethacrylates are preferred, especially isobornyl acrylate, hexanediol diacrylate, dipropylene glycol diacrylate, tripropylene glycol diacrylate, and Laromer® 8887 from BASF AG. Very particular preference is given to isobornyl acrylate, hexanediol diacrylate, dipropylene glycol diacrylate, and tripropylene glycol diacrylate.

The coating compositions of the invention comprise photoinitiators or photoinitiator combinations as commonly used in radiation-curable coating compositions and able to initiate the polymerization of ethylenically unsaturated double bonds on exposure to UV radiation. Radiation-curable coating compositions generally contain, based on the overall weight of P1 and, if present, of the reactive diluents, at least 0.1% by weight, preferably at least 0.5% by weight and up to 10% by weight, more preferably from 0.5 to 6% by weight, in particular from 1 to 4% by weight, of at least one photoinitiator. Suitable photoinitiators are, for example, benzophenone and derivatives of benzophenone, such as 4-phenylbenzophenone and 4-chlorobenzophenone, Michler's ketone, anthrone, acetophenone derivatives, such as 1-benzoylcyclohexan-1-ol, 2-hydroxy-2,2-dimethylacetophenone and 2,2-dimethoxy-2-phenylacetophenone, benzoin and benzoin ethers, such as methyl, ethyl and butyl benzoin ether, benzil ketals, such as benzil dimethyl ketal, 2-methyl-1-(4-methylthiophenyl)-2-morpholinopropan-1-one, anthraquinone and its derivatives, such as β-methylanthraquinone and tert-butylanthraquinone, acylphosphine oxides, such as 2,4,6-trimethylbenzoyldiphenylphosphine oxide, ethyl 2,4,6-trimethylbenzoylphenylphosphinate, and bisacylphosphine oxides. Initiators of this kind are, for example, the products available commercially under the brand names Irgacure® 184, Darocure® 1173 from Ciba Geigy, Genocure® from Rahn, or Lucirin® TPO from BASF AG. Preferred photoinitiators also include phenylglyoxalic acid, its esters and its salts, which may also be used in combination with one of the abovementioned photoinitiators. For further details reference may hereby be made to German Patent Application P 198 267 12.6 in its entirety.

Furthermore, the coating compositions may additionally comprise customary auxiliaries and/or additives, examples being light stabilizers (for example, HALS compounds, benzotriazoles, oxalanilides, and the like), slip additives, polymerization inhibitors, flatting agents, defoamers, leveling agents, and film-forming auxiliaries, e.g., cellulose derivatives, or other additives commonly used in topcoats. These customary auxiliaries and/or additives are commonly used in an amount of up to 15% by weight, preferably from 2 to 9% by weight, based on the overall weight of P1 and, if present, of the reactive diluents.

In the process of the invention it is preferred to use flowable or liquid coating compositions. These may be applied by the standard methods—for example, by dip coating, spraying or knife coating—to the surfaces of the article that is to be coated.

If desired, the still wet coating may be subjected to a drying step prior to curing with UV radiation. Alternatively, the still wet coating may first be partly crosslinked and then cured with UV radiation.

In general, the coating composition of the invention is applied in an amount of from 3 to 200 $g/m^2$, preferably from 5 to 150 $g/m^2$. This produces coat thicknesses in the cured state of from 3 to 200 $\mu$m, preferably from 5 to 150 $\mu$m.

In the process of the invention, the coating compositions are frequently used in the form of clearcoats, so that they normally contain no fillers, or only transparent fillers, and no hiding pigments. Use in the form of pigmented coating compositions is, however, also possible. In that case the coating compositions contain from 2 to 40% by weight, based on the overall weight of the coating composition, of one or more pigments. Furthermore, in this case the coating compositions may contain from 1 to 30% by weight, based on the overall weight of the coating composition, of one or more fillers.

Moreover, it is also possible to use the UV-curable coating compositions in the process of the invention in the form of aqueous formulations. Binder dispersions or emulsions of this kind are virtually free from environmentally harmful, volatile constituents, such as monomers or cosolvents. Crosslinking in accordance with the process described here under a protective-gas atmosphere takes place following complete evaporation of the water and, in the case of spray application, after a complete escape of the included air as well. With regard to the preparation and processing of radiation-curable aqueous binder dispersions and emulsions, exemplary reference is made at this point to EP-A 12 339.

A very wide variety of substrates may be coated by means of the process of the invention, examples being glass, metal substrates, such as aluminum, steel and other ferrous alloys, and also wood, paper, plastics, and mineral substrates, e.g., concrete roof tiles and fiber cement slabs. The process of the invention is also suited to the coating of packaging containers and to the coating of thin sheets for the furniture industry. A further feature of the process of the invention is that not only planar or substantially planar articles but also structures, i.e., articles having a three-dimensional form, may be provided with scratch-resistant coatings.

To produce coatings on metal substrates, the coating compositions of the invention are applied preferably to primed or basecoated metal surfaces, e.g. metal sheets or metal strips, three-dimensionally formed metal articles, e.g., shaped parts made from metal sheets, such as bodywork parts, casings, frame profiles for windows or the like. The commonly used basecoat materials may be used as primers. Both conventional and aqueous basecoat materials are employed. Further, it is also possible to apply the coating compositions of the invention to metal substrates which are first coated with an electrodeposition coating and subsequently coated with a functional coat and wet-on-wet with a basecoat material. In the case of said processes it is generally necessary for the basecoat material and the surfacer and/or the functional coat to be baked before the coating composition of the invention is applied.

Installations for the curing of radiation-curable coatings under standard atmospheric conditions and under strict exclusion of oxygen are known to the skilled worker (cf., e.g., R. Holmes, U.V. and E.B. Curing Formulations for Printing Inks, Coatings and Paints, SITA Technology, Academic Press, London, United Kingdom 1984). The process of the invention may in principle be carried out in both types of installation. The installations for curing under standard atmospheric conditions are then provided with additional devices by means of which those regions of the installation within which the coating is cured—for example, the curing unit in a coating line—are flushed with an inert gas or with a mixture of inert gas and oxygen or air in order to achieve the desired oxygen concentration at the site of curing. For example, one or more nozzles or nozzle arrays for the supply of protective gas may be provided in the openings of the installation through which the substrate provided with the wet coating is supplied to the UV source, for example, a high-pressure mercury lamp. Additionally it is advisable to provide further facilities for the supply of protective gas in the region of the UV source. In the case of customary UV curing apparatus, which provide a UV curing unit with an entry and an exit opening and a conveyor belt which transports the still-wet, coated article through the entry opening into the curing unit, past the UV source, and subsequently through the exit opening out of the curing unit, it is common to provide at least one device each for flushing with protective gas, e.g., a nozzle array, in the entry opening and in the exit opening, and also, if desired, further devices for flushing with inert gas in the interior of the curing unit, e.g., in the vicinity of the UV source. The surfaces of uniformly shaped structures, e.g., vehicle bodies and bodywork parts, may be guided past a UV source through a region enriched with protective gas, similar to the drying zone of a car wash line. It is likewise possible to move a mobile UV source over the contour of a structure that is present within the region enriched with protective gas. Installations for the UV curing of structures, especially structures having a complex three-dimensional form, are known, for example, from U.S. Pat. No. 4,208,587 and from WO 98/53008. The types of installation described therein may be converted in the manner described above for use in the process of the invention with suitable flushing devices for protective gas.

The UV source used for curing may be provided with nozzles or slots through which protective gas flows continuously in the course of curing, i.e., in the course of exposure of the article provided with the wet coating composition, so that at the site of radiation curing the oxygen concentration is reduced to the value in accordance with the invention. The nozzles or slots are preferably arranged in the form of a ring or crown around the UV source. For curing the complete surface of a structure, a UV source equipped in this manner may also be guided over the structure by means of suitable devices—for example, by means of a robot arm (cf. also WO 98/53008).

The curing of the coated surfaces by means of UV radiation may of course also take place in outwardly closed-off rooms or chambers having a reduced oxygen content in the atmosphere.

One advantage of the process of the invention is that the desired oxygen concentrations may be realized without great technical expenditure. Moreover, the amount of inert gas used is lower than the amount normally necessary to achieve strict exclusion of oxygen, since the oxygen concentrations in accordance with the invention may be established just by flushing with an amount of inert gas insufficient to displace the oxygen completely from the atmosphere present in the curing zone. To this extent, the process of the invention may also be classified as a process for UV curing of UV-curable coatings under a reduced or restricted protective-gas atmosphere.

These advantages are manifested in particular in the case of structures of complex design. With structures of this kind there is, fundamentally, the problem that complete exclusion of oxygen in the surface region of the structure is not possible by flushing with inert gas. Consequently, UV curing of structures provided with UV-curable coatings was hitherto considered possible only in outwardly closed-off curing units, and thus was considered uneconomic. In contrast, the process of the invention permits simple curing of the surfaces provided with a radiation-curable coating on articles of any desired form, owing to its tolerance for residual amounts of oxygen in the surface regions of the coated article. A further advantage is that the ambient air of the actual curing unit, in a coating line, for instance, still contains sufficient oxygen and so there is not the danger of asphyxiation which exists for closed-off rooms with a protective-gas atmosphere.

The coatings obtained by the process of the invention have a considerably improved scratch resistance. High scratch resistance is interpreted in this case as a good performance in the Scotch-Brite test. Thus the coatings obtainable in accordance with the invention frequently have delta gloss values in accordance with the Scotch-Brite test of not more than 30, with values of not more than 20 or not more than 10 also being achieved, without the need for complete exclusion of oxygen.

Below, the invention is illustrated with reference to working examples. All parts therein are by weight unless expressly stated otherwise.

Unless expressly stated otherwise, the coating compositions were prepared from the components indicated in the working examples by intensive stirring with a dissolver or stirrer.

To produce the scratch-resistant coatings, the coating compositions described in the working examples were applied in the form of a film to cleaned, blackened glass plates using a box-type coating bar with a gap size of 200 μm. The films were cured in a IST coating unit M 40 2×1-R-IR-SLC-So inert with devices for the supply of protective gas in the region of the entry opening and exit opening, with two UV lamps (wavelength range, high-pressure mercury lamps type M 400 U2H and M 400 U2HC), and with a conveyor belt speed of 10 m/min. The radiation dose was approximately 1800 mJ/cm$^2$. The oxygen content in the curing zone was adjusted by throttling the nitrogen supply. The oxygen content in the curing region was measured between the two UV lamps with the aid of a Galvanoflux probe (electrochemical cell based on a lead/lead oxide redox couple having three measurement ranges: 0–1000 ppm, 0–5%, and 0–25%). Prior to each curing, the oxygen concentration was adjusted and a time of 20 minutes was left for the atmosphere to equilibrate.

The mechanical stability of the coatings cured at different oxygen concentrations was examined by determining the König pendulum hardness, DIN 53157, ISO 1522, and by determining the scratch resistance by the Scotch-Brite test following storage for 24 hours in a climate-controlled chamber.

In the Scotch-Brite test, the test element used is a 3×3 cm silicon carbide-modified fiber web (Scotch Brite SUFN, 3M Deutschland, 41453 Neuss, Germany) mounted on a cylinder. This cylinder presses the fiber web against the coating under a weight of 750 g and is moved pneumatically over the coating. The path length of the deflection is 7 cm. After 10 or 50 double strokes (DS), the gloss (sixfold determination) is measured in the central stress region in analogy to DIN 67530, ISO 2813, at an incident angle of 60°. The difference (delta gloss value) is formed from the gloss values of the coatings before and after the mechanical stressing. The loss of gloss, i.e., the delta gloss values, is inversely proportional to the scratch resistance.

EXAMPLE 1

Coating Based on a Urethane Acrylate 100 parts of Laromer® LR 8987; commercial blend of an aliphatic urethane acrylate containing 30% by weight hexanediol diacrylate, from BASF AG.

Molecular weight approx. 650 g/mol,

Functionality approx. 2.8 double bonds/mol (approx. 4.5 mol/kg),

Viscosity 2–6 Pa.s (DIN EN ISO 3219).

2 parts of Irgacure I 184: commercial photoinitiator from Ciba-Geigy.

TABLE 1

Test results of the coating of Example 1 on curing at different oxygen concentrations

| Oxygen concentration | Scratch resistance (loss of gloss) 10 DS | 50 DS | Pendulum attenuation (s) |
|---|---|---|---|
| 21% (air) | 50.0 | 56.4 | 175 |
| 15% | 9.5 | 15.8 | 183 |
| 10% | 6.5 | 11.8 | 185 |
| 7% | 6.7 | 9.3 | 181 |
| 5% | 6.7 | 8.7 | 183 |
| 3% | 4.4 | 8.4 | 182 |
| 1.3% | 4.2 | 9.1 | 182 |
| 0.5% | 3.9 | 8.0 | 188 |
| 340 ppm (inert) | 4.2 | 9.2 | 189 |

EXAMPLE 2

Coating Based on a Polyester Acrylate 100 parts of Laromer® LR 8800: commercial blend of a polyester acrylate, modified with an aromatic epoxy acrylate, from BASF AG. Polyester acrylate based on trimethylolpropane and maleic acid.

Molecular weight approx. 900 g/mol,

Functionality approx. 3.5 (approx. 3.9 mol double bond/kg),

Viscosity 4–8 Pa.s (DIN EN ISO 3219).

2 parts of Irgacure I 184: commercial photoinitiator from Ciba-Geigy.

TABLE 2

Test results of the coating of Example 2 on curing at different oxygen concentrations

| Oxygen concentration | Scratch resistance (loss of gloss) 10 DS | 50 DS | Pendulum attenuation (s) |
|---|---|---|---|
| 21% (air) | 77.0 | 78.5 | 99 |
| 11% | 59.7 | 74.2 | 111 |
| 7% | 4.9 | 12.1 | 122 |
| 5% | 3.5 | 5.4 | 120 |
| 3% | 5.9 | 10.5 | 113 |
| 1.3% | 2.2 | 4.5 | 127 |
| 0.5% | 3.7 | 6.3 | 120 |
| 340 ppm (inert) | 3.0 | 5.2 | 116 |

EXAMPLE 3

Coating Based on an Oligoether Acrylate 100 parts of Laromer® LR 8863, commercial oligoether acrylate, from BASF AG.

Molecular weight approx. 500 g/mol,

Functionality approx. 3 (approx. 6.0 mol double bonds/kg),

Viscosity approx. 0.1 Pa.s (DIN EN ISO 3219).

2 parts of Irgacure I 184: commercial photoinitiator from Ciba-Geigy.

TABLE 3

Test results of the coating of Example 3 on curing at different oxygen concentrations

| Oxygen concentration | Scratch resistance (loss of gloss) 10 DS | 50 DS | Pendulum attenuation (s) |
|---|---|---|---|
| 21% (air) | n.m. | n.m. | n.m. |
| 15% | n.m. | n.m. | n.m. |
| 11% | 60.3 | 67.9 | 164 |
| 7% | 29.0 | 51.7 | 160 |
| 5% | 2.3 | 5.1 | 175 |
| 3% | 2.6 | 6.7 | 174 |
| 1.4% | 1.4 | 3.4 | 175 |
| 0.5% | 1.7 | 4.5 | 173 |
| 340 ppm (inert) | 1.0 | 3.3 | 174 |

n.m.: not measurable since surface too soft.

EXAMPLE 4

Coating Based on an Amine-modified Oligoether Acrylate 100 parts of Laromer® LR 8869: commercial, amine-modified oligoether acrylate, from BASF AG.

Molecular weight approx. 550 g/mol,

Functionality approx. 3.

Viscosity 0.08–0.12 Pa.s (DIN EN ISO 3219).

2 parts of Irgacure I 184: commercial photoinitiator from Ciba-Geigy.

TABLE 4

Test results of the coating of Example 4 on curing at different oxygen concentrations

| Oxygen concentration | Scratch resistance (loss of gloss) 10 DS | 50 DS | Pendulum attenuation (s) |
|---|---|---|---|
| 21% (air) | 79.2 | 80.8 | 76 |
| 17% | 17.7 | 40.0 | 70 |
| 15% | 22.0 | 37.1 | 115 |
| 11% | 9.5 | 17.7 | 115 |
| 5% | 5.1 | 12.8 | 118 |
| 3% | 6.0 | 12.2 | 127 |
| 1.4% | 2.8 | 5.3 | 126 |
| 0.5% | 1.9 | 5.6 | 112 |
| 340 ppm (inert) | 1.0 | 3.7 | 122 |

What is claimed is:

1. A process for producing a scratch-resistant coating, said process comprising:

applying at least one UV-curable coating composition to at least one surface of an article to be coated, said coating composition comprising at least one polymer and/or oligomer P1 containing an average of at least one ethylenically unsaturated double bond per molecule, and curing said coating composition by exposure to UV radiation under an oxygen-containing protective gas which has an oxygen partial pressure in the range of from 0.5 to 18 kPa.

2. The process as claimed in claim 1, wherein the polymer and/or oligomer P1 has a double bond content in the range of from 0.01 to 1 mol/100 g of P1.

3. The process as claimed in claim 1, wherein a number-average molecular weight of P1 is in the range of from 400 to 10,000 daltons.

4. The process as claimed in claim 1, wherein the ethylenic double bonds in P1 are in the form of acrylate, methacrylate, acrylamido or methacrylamido groups.

5. The process as claimed in claim 4, wherein P1 is selected from the group consisting of urethane (meth) acrylates, polyester (meth)acrylates, oligoether (meth) acrylates and epoxy (meth)acrylates.

6. The process as claimed in claim 1, wherein the UV-curable coating composition further comprises one or more reactive diluents.

7. The process as claimed in claim 6, wherein the reactive diluent is selected from the group consisting of compounds having one or two acrylate groups, compounds having one or two methacrylate groups and mixtures thereof.

8. The process as claimed in claim 1, wherein the article to be coated is a three-dimensional structure.

9. The process as claimed in claim 1, wherein a region of an installation in which the coating is cured by exposure to UV radiation is flushed with a protective gas.

10. The process as claimed in claim 1, wherein the oxygen partial pressure is in the range of from 0.5 to 17 kPa.

11. The process as claimed in claim 1, wherein the oxygen partial pressure is in the range of from 0.5 to 15.3 kPa.

12. The process as claimed in claim 1, wherein the oxygen partial pressure is in the range of from 0.5 to 13.5 kPa.

13. The process as claimed in claim 1, wherein the oxygen partial pressure is in the range of from 0.5 to 10 kPa.

14. The process as claimed in claim 1, wherein the oxygen partial pressure is in the range of from 0.5 to 6.3 kPa.

15. The process as claimed in claim 1, wherein the oxygen partial pressure is in the range of from 0.9 to 6.3 kPa.

16. The process as claimed in claim 1, wherein the oxygen partial pressure is in the range of from 1.8 to 6.3 kPa.

17. The process as claimed in claim 1, wherein the oxygen partial pressure is in the range of from 2.5 to 6.3 kPa.

* * * * *